(12) United States Patent
Henderson et al.

(10) Patent No.: US 11,639,990 B2
(45) Date of Patent: May 2, 2023

(54) DIGITAL PIXELS AND OPERATING METHODS THEREOF

(71) Applicants: The University Court of The University of Edinburgh, Edinburgh (GB); Sense Photonics, Inc., Durham, NC (US)

(72) Inventors: Robert Henderson, Edinburgh (GB); Tarek Al Abbas, Edinburgh (GB); Neil Calder, Edinburgh (GB)

(*) Notice: Subject to any disclaimer, the term of this patent is extended or adjusted under 35 U.S.C. 154(b) by 455 days.

(21) Appl. No.: 16/746,218

(22) Filed: Jan. 17, 2020

(65) Prior Publication Data

US 2020/0233068 A1 Jul. 23, 2020

Related U.S. Application Data

(60) Provisional application No. 62/800,050, filed on Feb. 1, 2019, provisional application No. 62/794,403, filed on Jan. 18, 2019.

(51) Int. Cl.
| | |
|---|---|
| G01S 7/48 | (2006.01) |
| G01S 7/4863 | (2020.01) |
| G01S 7/4865 | (2020.01) |
| G01S 17/10 | (2020.01) |

(52) U.S. Cl.
CPC .......... G01S 7/4863 (2013.01); G01S 7/4865 (2013.01); G01S 17/10 (2013.01)

(58) Field of Classification Search
USPC ................................................ 356/4.01, 5.01
See application file for complete search history.

(56) References Cited

U.S. PATENT DOCUMENTS

| | | | |
|---|---|---|---|
| 2016/0238610 A1* | 8/2016 | Garini | G01N 21/6458 |
| 2017/0003382 A1 | 1/2017 | Mellot | |
| 2017/0052065 A1 | 2/2017 | Sharma et al. | |
| 2017/0248796 A1 | 8/2017 | Banks et al. | |
| 2018/0209846 A1 | 7/2018 | Mandai et al. | |
| 2018/0253404 A1* | 9/2018 | Moore | G01S 7/4863 |

(Continued)

FOREIGN PATENT DOCUMENTS

| | | | |
|---|---|---|---|
| EP | 3182162 | 6/2017 | |
| EP | 3460508 A1 * | 3/2019 | G01S 17/10 |

(Continued)

OTHER PUBLICATIONS

PCT Notification Concerning Transmittal of International Preliminary Report on Patentability, dated Jul. 29, 2021, for corresponding PCT International Application No. PCT/US2020/014033.

(Continued)

*Primary Examiner* — James R Hulka
(74) *Attorney, Agent, or Firm* — Myers Bigel, P.A.

(57) ABSTRACT

A Light Detection and Ranging (LIDAR) measurement circuit includes an array of single photon detectors configured to detect photons responsive to emission of an optical signal from an emitter, and a pixel processing circuit that is configured to calculate an estimated time of arrival of photons incident on the array of single photon detectors by utilizing a plurality of coarse histogram bins. Respective ones of the plurality of coarse histogram bins are associated with a duration that is greater than one-sixteenth of a pulse width of the optical signal.

26 Claims, 12 Drawing Sheets

(56) References Cited

U.S. PATENT DOCUMENTS

| | | | |
|---|---|---|---|
| 2018/0259645 A1* | 9/2018 | Shu | G01S 17/42 |
| 2018/0299552 A1* | 10/2018 | Shu | G01S 17/89 |
| 2019/0250257 A1* | 8/2019 | Finkelstein | G01S 7/4813 |
| 2019/0383913 A1* | 12/2019 | Crouch | G01S 17/42 |
| 2019/0383926 A1* | 12/2019 | Crouch | G01S 13/428 |
| 2020/0158836 A1* | 5/2020 | Henderson | G01S 7/4863 |
| 2020/0182983 A1* | 6/2020 | Calder | H01L 31/02027 |
| 2020/0300989 A1* | 9/2020 | Glover | G01S 7/4865 |
| 2022/0099814 A1* | 3/2022 | Finkelstein | G01S 7/484 |

FOREIGN PATENT DOCUMENTS

| | | |
|---|---|---|
| WO | 2018/122560 | 7/2018 |
| WO | 2018/160886 | 9/2018 |

OTHER PUBLICATIONS

Extended European Search Report Corresponding to European Application No. 20741120.8 (12 pages) (dated Jul. 15, 2022).

Villa et al. "CMOS Imager With 1024 SPADs and TDCs for Single-Photon Timing and 3-D Time-of-Flight" IEEE Journal of Selected Topics in Quantum Electronics 20(6):3804810 (Nov.-Dec. 2014).

Villa et al. "CMOS single photon sensor with in-pixel TDC for time-of-flight applications" 2013 IEEE Nordic-Mediterranean Workshop on Time-to-Digital Converters (Oct. 3, 2013).

International Search Report and Written Opinion for PCT/US2020/014033 dated May 20, 2020, 12 pages.

Swartzlander, Jr., "Parallel Counters," IEEE Transactions on Computers, vol. C-22, No. 11, Nov. 1973, pp. 1021-1024).

E. Fisher, I. Underwood and R. Henderson, "A Reconfigurable Single-Photon-Counting Integrating Receiver for Optical Communications," in IEEE Journal of Solid-State Circuits, vol. 48, No. 7, pp. 1638-1650, Jul. 2013.

* cited by examiner

DIGITAL PIXELS AND OPERATING METHODS THEREOF

CLAIM OF PRIORITY

This application claims priority from U.S. Provisional Application No. 62/794,403 filed Jan. 18, 2019, entitled "Histogram-assisted Pixel," and U.S. Provisional Application No. 62/800,050 filed Feb. 1, 2019, entitled "Digital Pixel," the entire content and disclosure of each of which are incorporated by reference herein.

FIELD

The present invention is directed to Light Detection and Ranging (LIDAR or lidar) systems, and more particularly, to methods and devices to reduce power consumption in time-of-flight LIDAR systems.

BACKGROUND

Time of flight (ToF) based imaging is used in a number of applications including range finding, depth profiling, and 3D imaging (e.g., Light Detection and Ranging (LIDAR)). Direct time of flight measurement includes directly measuring the length of time between emitting radiation and sensing the radiation after reflection from an object or other target. From this, the distance to the target can be determined. In specific applications, the sensing of the reflected radiation may be performed using an array of single-photon detectors, such as a Single Photon Avalanche Diode (SPAD) array. SPAD arrays may be used as solid-state detectors in imaging applications where high sensitivity and timing resolution are required.

A SPAD is based on a p-n junction device biased beyond its breakdown region, for example, by or in response to a strobe signal having a desired pulse width. The high reverse bias voltage generates a sufficient magnitude of electric field such that a single charge carrier that is introduced into the depletion layer of the device can cause a self-sustaining avalanche via impact ionization. The avalanche is quenched by a quench circuit, either actively or passively, to allow the device to be "reset" to detect further photons. The initiating charge carrier can be photo-electrically generated by means of a single incident photon striking the high field region. It is this feature which gives rise to the name "Single Photon Avalanche Diode." This single photon detection mode of operation is often referred to as "Geiger Mode."

To count photons that are incident on array of SPADs, some ToF pixel approaches may use either a digital counter or an analog counter. Digital counters may be easier to implement and scale, but may be expensive in terms of area (e.g., with respect to the physical size of the array). Analog counters may be more compact, but may suffer from limited photon counting depth (bit depth), noise, and/or uniformity.

To time stamp incident photons, some SPAD array-based ToF pixel approaches have used a Time to Digital converter (TDC). TDCs can be used in time of flight imaging applications to increase timing resolution over that of a single clock cycle. Advantages of such a digital approach include that the size of the TDC tends to scale with technology node, and the stored value can be robust to leakage.

However, TDC circuits may only be able to process one event in a single measurement cycle, such that multiple TDCs may be required for an array of SPADs. TDCs may also be very power consuming, making larger arrays more difficult to implement. TDCs may also generate large amounts of data, e.g., 10-16-bit timestamps per photon. A single SPAD connected to a TDC may generate millions of such timestamps per second. An imaging array of greater than 100,000 pixels therefore can generate unfeasibly large data rates.

SUMMARY

According to some embodiments of the present disclosure, a Light Detection and Ranging (LIDAR) measurement circuit includes an array of single photon detectors configured to detect photons responsive to emission of an optical signal from an emitter, and a pixel processing circuit that is configured to calculate an estimated time of arrival of photons incident on the array of single photon detectors by utilizing a plurality of coarse histogram bins, where respective ones of the plurality of coarse histogram bins are associated with a duration that is greater than one-sixteenth of a pulse width of the optical signal.

In some embodiments, the emitter is a laser and a duration of respective ones of the plurality of coarse histogram bins is based on the pulse width of the optical signal.

In some embodiments, the duration of the respective ones of the plurality of coarse histogram bins is between greater than or equal to one-fourth of the pulse width of the laser and less than or equal to the pulse width of the laser.

In some embodiments, the pixel processing circuit is further configured to utilize an edge sampling circuit to calculate a number of the array of single photon detectors that detected a photon based on asynchronously received signals from respective ones of the array of single photon detectors, and output the number of the array of single photon detectors that detected the photon according to a clock signal.

In some embodiments, the pixel processing circuit is further configured to calculate the estimated time of arrival based on a center of mass calculation, and wherein the center of mass calculation is based on a peak histogram bin of the plurality of coarse histogram bins.

In some embodiments, the center of mass calculation is further based on a neighboring bin of the plurality of coarse histogram bins that is immediately adjacent the peak histogram bin.

In some embodiments, the neighboring bin is a first neighboring bin, and the center of mass calculation is further based on a second neighboring bin of the plurality of coarse histogram bins that is immediately adjacent the peak histogram bin and opposite from the first neighboring bin.

In some embodiments, the pixel processing circuit is further configured to detect a saturation in a first bin of the coarse histogram bins and block an operation of the pixel processing circuit responsive to the detection of the saturation.

In some embodiments, the pixel processing circuit is further configured to calculate the estimated time of arrival of the photons incident on the array of single photon detectors utilizing a clock signal that is between 50 MHz and 1 GHz.

In some embodiments, the clock signal is synchronous with a pulse frequency of the emitter.

In some embodiments, the pixel processing circuit is further configured to determine an address for accessing a respective one of the plurality of coarse histogram bins based on a clock signal.

In some embodiments, the address is sequentially incremented or decremented based on an amount of time since the emission of the optical signal.

In some embodiments, the plurality of coarse histogram bins are stored in a static random access memory (SRAM).

According to some embodiments of the present disclosure, a Light Detection and Ranging (LIDAR) measurement circuit includes an activated detector counting circuit coupled to a plurality of detectors and configured to output a count of a number of the plurality of detectors that have detected a photon within a given time duration, an adder circuit configured to update a coarse histogram bin of a plurality of coarse histogram bins based on the count that is output from the activated detector counting circuit, and a Center of Mass Method (CMM) computation circuit configured to calculate an estimated time of arrival of photons incident on the plurality of detectors by performing a center of mass calculation on a subset of the plurality of coarse histogram bins.

In some embodiments, the subset of the plurality of coarse histogram bins comprises a peak histogram bin containing a highest count of the plurality of coarse histogram bins.

In some embodiments, the subset of the plurality of coarse histogram bins further comprises a neighboring bin of the plurality of coarse histogram bins that is immediately adjacent the peak histogram bin.

In some embodiments, the plurality of detectors are configured to detect photons responsive to an optical signal emitted from an emitter, and respective ones of the plurality of coarse histogram bins are associated with a duration that is greater than one-sixteenth of a pulse width of the optical signal.

In some embodiments, the adder circuit is further configured to generate a saturation detection signal responsive to detection of a saturation in a first bin of the plurality of coarse histogram bins.

In some embodiments, the activated detector counting circuit is further configured to utilize an edge sampling circuit to output the number of the detectors that detected the photon according to a clock signal.

In some embodiments, the CMM computation circuit is configured to calculate the estimated time of arrival of the photons incident on the plurality of detectors during a period of the clock signal.

In some embodiments, the adder circuit is further configured to determine an address for accessing the coarse histogram bin based on a clock signal.

According to some embodiments of the present disclosure, a method for operating a Light Detection and Ranging (LIDAR) measurement circuit includes detecting photons associated with an emission of an optical signal from an emitter by an array of single photon detectors, and calculating an estimated time of arrival of photons incident on the array of single photon detectors utilizing a plurality of coarse histogram bins, wherein respective ones of the coarse histogram bins are associated with a duration that is greater than one-sixteenth of a pulse width of the optical signal.

In some embodiments, the method further includes calculating a number of the array of single photon detectors that detected a photon based on asynchronously received signals from respective ones of the array of single photon detectors, and synchronously outputting the number of the array of single photon detectors that detected the photon according to a clock signal.

In some embodiments, the method further includes calculating the estimated time of arrival based on a center of mass calculation that is based on a peak histogram bin of the plurality of coarse histogram bins.

In some embodiments, the method further includes detecting a saturation in a first bin of the coarse histogram bins, and blocking an operation of the LIDAR measurement circuit responsive to the detection of the saturation.

In some embodiments, the method further includes determining an address for accessing a respective one of the plurality of coarse histogram bins based on a clock signal.

DETAILED DESCRIPTION

Figure 1:
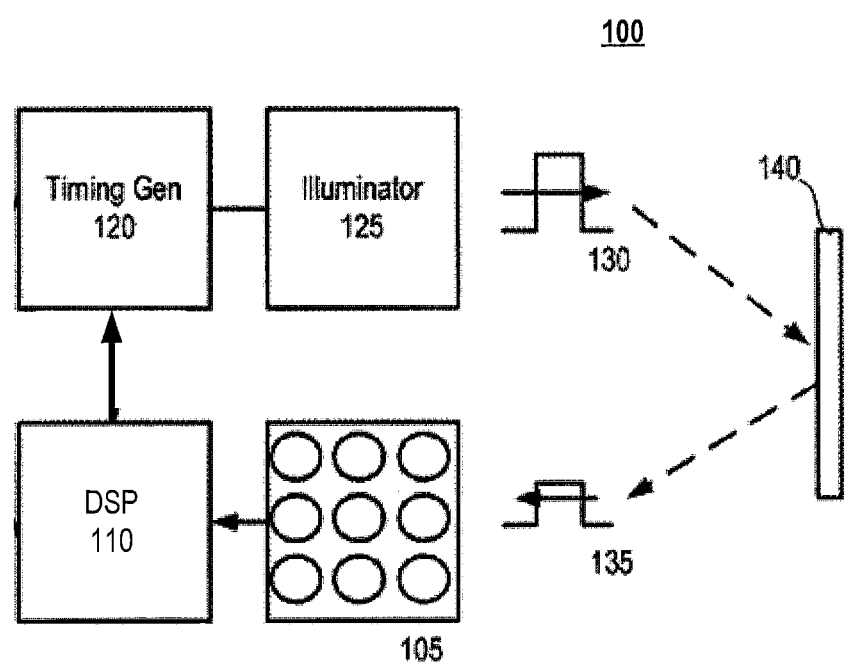
FIG. 1 illustrates components of a time of flight measurement system or circuit in a LIDAR application in accordance with some embodiments described herein.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Some conventional ToF systems utilizing large numbers of pixels may generate large data rates. Data rates can be compressed by histogramming timestamps. Histogramming timestamps may include grouping counts of arriving photons within "bins" based on their time of arrival. For example, a histogram data repository may be generated including respective bins associated with time durations, or "windows." However, this can involve considerable memory resources which may be inefficiently used in typical ToF LIDAR systems. For example, the memory depth of the histogram bins is typically set by the maximum laser returns that may occur in the peak arrival window, whereas, in practice, many or most histogram bins will be sparsely occupied (e.g., only by background noise). In addition, conventionally, thousands of time bins would typically be used to form a histogram sufficient to cover the typical time range of a LIDAR system (e.g., microseconds) with the typical TDC resolution (e.g., 50-100 ps).

Center of Mass Method (CMM) Time of Flight pixels are described by Henderson et al. in U.S. patent application Ser. No. 16/688,043 entitled "Digital Pixel," filed on Nov. 19, 2019, the entire contents of which are incorporated herein by reference. CMM may be configured to calculate the center-of-mass of the distribution of the times-of-arrival (TOAs) of signal photons over a correlation window, which can be used to estimate the time of flight to (and thus, distance of) a target.

A ToF measurement apparatus, including those incorporating CMM calculations, may encounter a number of challenges. For example, if targets are mid-strobe window (e.g., located at a middle of a corresponding distance sub-range) and/or are at a longer range (e.g., so that the number of correlated photon counts may not be easily tested and compared against a background strobe window, such as a strobe window configured to capture primarily background signals, to determine if a signal is present) then the measurement may be forced to perform operations such as dithering the laser pulse and reading out another set of images. Dithering may include time offsetting the laser pulse with respect to the strobe window by a time period chosen at random on each laser cycle. These additional operations may increase the I/O rate and/or power consumption of the device, and may reduce a time for useful strobe windows.

Some embodiments of the present disclosure are directed to arrays of single-photon detectors that use digital signal processing for CMM-based direct ToF calculations, also referred to herein as "digital pixels" or "CMM pixels." CMM pixels as described herein may be configured to count incident photons without the use of a TDC, and can thus integrate many time stamps in pixel, in a manner that may be less computationally intensive and/or power intensive than some approaches.

FIG. 1 illustrates components of a time of flight measurement system or circuit 100 in a LIDAR application in accordance with some embodiments described herein. The circuit 100 may include a digital signal processor (DSP) 110, a timing generator 120 which controls timing of an illumination source 125, and an array of single-photon detectors (illustrated by way of example as a SPAD array 105, though the embodiments of the invention are not limited thereto). The illumination source 125 (e.g., an emitter array) emits a radiation pulse 130 at a time controlled by the timing generator 120. Radiation 135 is reflected back from a target (illustrated by way of example as object 140), and is sensed by SPAD array 105. In some embodiments, a control circuit, such as a microcontroller or microprocessor, may be configured to provide signals (e.g., strobe signals) to the SPAD array 105 to enable/disable one or more of the elements of the array (e.g., individual SPAD detectors) so as to detect the reflected radiation 135 from the target object 140.

The DSP 110 may implement a CMM pixel processor that measures the time of flight (ToF) of the illumination pulse 130, 135 over the journey from illuminator 125 to object 140 and back to the SPAD array 105. More particularly, the CMM pixel processor of the DSP 110 calculates an estimate of the average ToF aggregated over many (e.g., hundreds or thousands) of laser pulses 130 and photon returns 135.

In some embodiments, each of the emitter elements in the emitter array is connected to and controlled by a driver circuit. In other embodiments, respective groups of emitter elements in the emitter array (e.g., emitter elements in spatial proximity to each other), may be connected to a driver circuit. The driver circuit or circuitry may include one or more driver transistors, which are configured to control the timing and amplitude of the optical emission signal. A timing circuit may likewise control the timing and gain/sensitivity of the detector array. Light emission from one or more of the emitters impinge on and is reflected by one or more targets, and the reflected light is detected as an optical signal by one or more of the detectors (e.g., via one or more lenses), converted into an electrical signal representation, and processed (e.g., based on time of flight) to define a 3-D point cloud representation of the field of view. Operations of LIDAR systems in accordance with embodiments of the present invention as described herein may be performed by one or more processors or control circuits, such as the DSP 110 shown in FIG. 1.

The DSP 110 may be configured to count incident photons in the reflected radiation 135 by implementing one or more accumulator circuits in accordance with embodiments described herein. More particularly, the accumulator may be configured to sum inputs received from the SPAD array 105 responsive to incident photons on the SPAD array 105. For example, the accumulator may be configured to calculate a "rolling" center of mass of the incident photons detected over a laser cycle, based on the number of SPADs triggered at each strobe interval or portion of the laser cycle (rather than by averaging the times at which the SPADs are triggered over the laser cycle, which would utilize time to digital conversion). The use of a DSP 110 (or other digital implementation) may be small enough to allow for three-dimensionally stacked implementations, with the array 105 "stacked" on top of a DSP 110 that is sized to fit within an area or footprint of the array 105.

In embodiments described herein, a detector strobe interval (or strobe window) may refer to the respective durations of activation and deactivation of one or more detectors (e.g., responsive to respective strobe signals from a control circuit) over the temporal period or time between pulses of the emitter(s) (which may likewise be responsive to respective emitter control signals from a control circuit). The time between pulses (which defines a laser cycle, or more generally emitter pulse frequency) may be selected or may otherwise correspond to a desired imaging distance range for the LIDAR system. Each strobe window may be differently delayed relative to the emitter pulses, and thus may correspond to a respective portion or subrange of the distance range. Each strobe window may also correspond to a respective image acquisition subframe of an image frame. That is, each image frame may include a plurality of subframes, where each of the subframes samples or collects data for a respective strobe window over the temporal period, and each strobe window covers or corresponds to a respective distance subrange of the distance range of the LIDAR system. Range measurements and strobe window subrange correspondence as described herein are based on time of flight of an emitted pulse. Some traditional strobing techniques (e.g., as described in United States Patent Application Publication No. 2017/0248796 to Banks et al., entitled "3d imaging system and method") may measure distance based on the strobe window from which an echo is received.

Some stacked pixels may be configured so as to provide more area for in-pixel digital circuitry. This extra area may be used to reconfigure digital flip-flops (DFFs) that are used in CMM measurement into a coarse histogram that may be used to identify background and signal strobe windows more robustly at long range. In some embodiments, CMM may be computed on peak bins to keep I/O rate low. As used herein, a "peak bin" refers to a bin of the histogram in which a largest number of photons have been detected as compared to other bins of the histogram.

Figure 2:
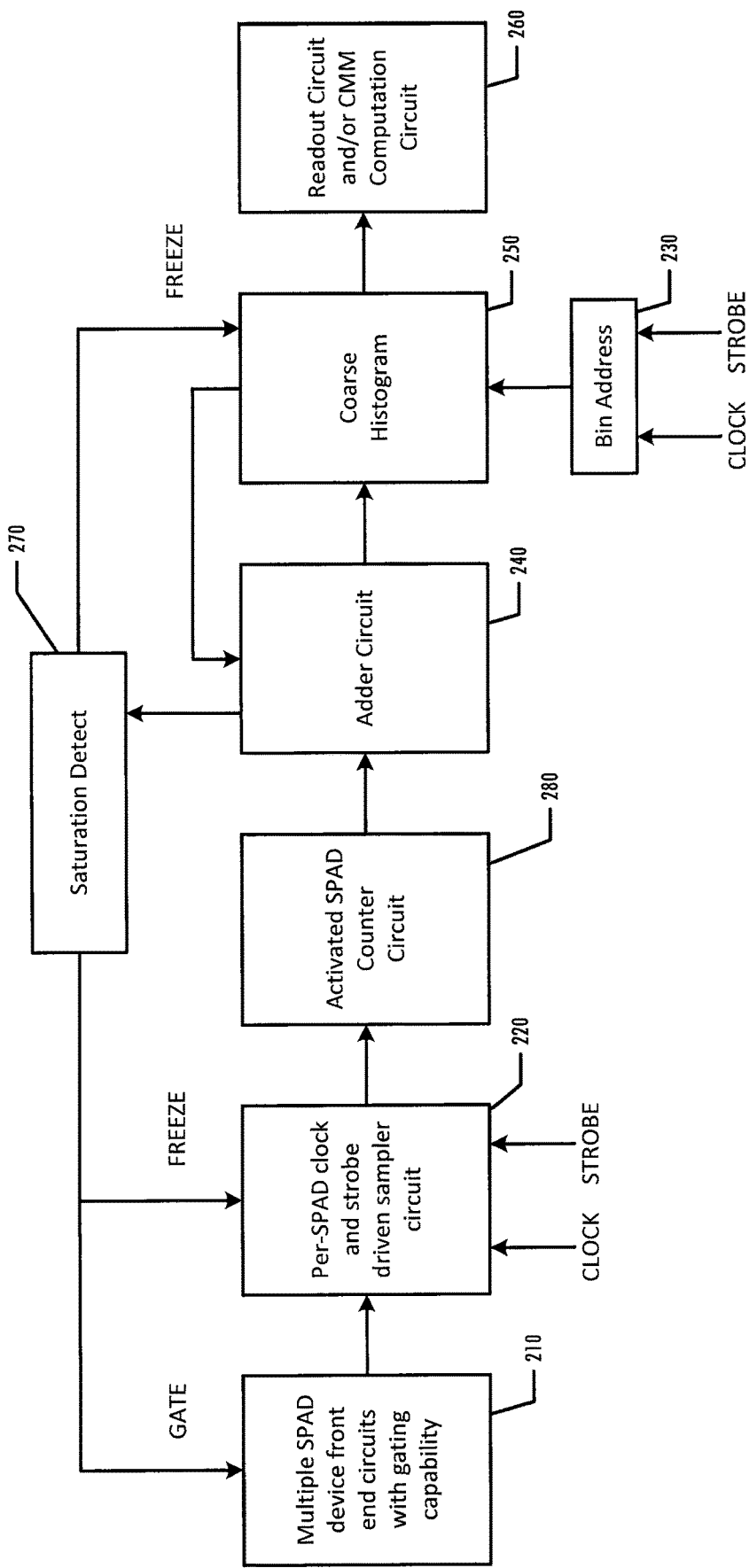
FIG. 2 is a block diagram illustrating a system and method for performing a coarse histogram for CMM calculation within a digital pixel, according to some embodiments described herein.

FIG. 2 is a block diagram illustrating a system and method for performing a coarse histogram for CMM calculation within a digital pixel, according to some embodiments described herein. Referring to FIG. 2, the method may include multiple SPADs 210 (e.g., detector elements such as those illustrated in FIG. 1) configured to detect incoming photons. The system may include a system clock CLOCK, and a system clock driven sampling circuit 220 that may sample the number of SPADs 210 that have fired within a given clock period. The sampling of the number of SPADs 210 that have fired during the clock period may provide a measure of the intensity of light during that interval of time. In some embodiments, the sampling only, or primarily, occurs within the strobe window (e.g., as controlled by strobe signal STROBE) of interest. The output of the sampling circuit 220 may be input to the activated SPAD counter circuit 280 that may collect a count of those detectors that have been activated during a particular cycle. This count may be provided as input to adder circuit 240.

A histogram including a number of histogram bins 230 may be provided, such as in a memory. The detected "counts" of photons incident on the detectors from the radiation reflected from the target object may be stored in the histogram bins 230. In some embodiments, each of the respective histogram bins 230 of the histogram may be associated with different durations of time that are associated with the optical emission of the LIDAR emitter during a particular strobe window. For example, different ones of the histogram bins 230 may be associated with different durations of time that have elapsed since the optical emission. Thus, different ones of the histogram bins 230 may be associated with different possible distances of the target object within the distance sub-range of the strobe window. Examples of methods to detect a target distance based on histograms are discussed, for example, in U.S. Patent Application Publication No. 2019/0250257, published Aug. 15, 2019, entitled "METHODS AND SYSTEMS FOR HIGH-RESOLUTION LONG-RANGE FLASH LIDAR," the contents of which are incorporated herein by reference. The adder circuit 240 may read an already-stored count from a histogram bin 230 associated with the strobe window, add the newly-sampled count from the activated SPAD counter circuit 280 to the already-stored count, and write back the sum to the histogram bin 230, a process referred to as a read-modify-write.

The histogram bins 230 may be cycled through (e.g., sequentially) by an address driven by the system clock CLOCK within the strobe period of interest (based on the strobe signal STROBE). That is, in some embodiments, an address of a histogram bin 230 in which the count is to be placed may be determined according to a time duration that has elapsed since an emission of an emitter pulse. As a result, rather than having to determine an address at which the histogram bin 230 is located, the address may be automatically determined, based on, for example, CLOCK and/or STROBE signals. The address at which the histogram bin 230 is located may be automatically (e.g., monotonically and/or sequentially) incremented or decremented, for example in a memory, based on the amount of time since the emitter pulse was emitted. For example, during a first duration after the emission of the emitter pulse, the LIDAR system may be configured to store the counts of detected photons via a read-modify-write operation in a memory location that is designated to store the photon counts associated with a first histogram bin 230, such as Bin 1. After the time period associated with Bin 1 elapses, the address at which photon counts are stored may be automatically sequentially advanced, for example, to point to a memory location that is designated to store the photon counts associated with a second histogram bin 230, such as Bin 2. The location at which photon counts are to be stored may continue to be incremented (e.g., to point to Bin 3, Bin 4, etc.) based on the CLOCK and/or STROBE signals. In this way, pixels operated according to embodiments of the present invention may be more efficient in writing and/or writing to the histogram bins 230.

The histogram may be readout fully and/or a CMM computation 260 may be performed on the coarse histogram data 250. In some embodiments, a saturation detect circuit 270 can freeze the pixel operation when a saturation is found in order to save power. As used herein, the saturation event refers to an instance where a "count" of detected photons exceeds a maximum available storage capacity for a particular bin. For example, if a histogram bin 230 is configured with three bits of storage, then the bin can only maintain a count of seven (e.g., 0-7) detected photons. Thus, once seven photons have been detected, the given bin is saturated. The saturation detect circuit 270 may also be used as an event-driven readout.

Figure 3:
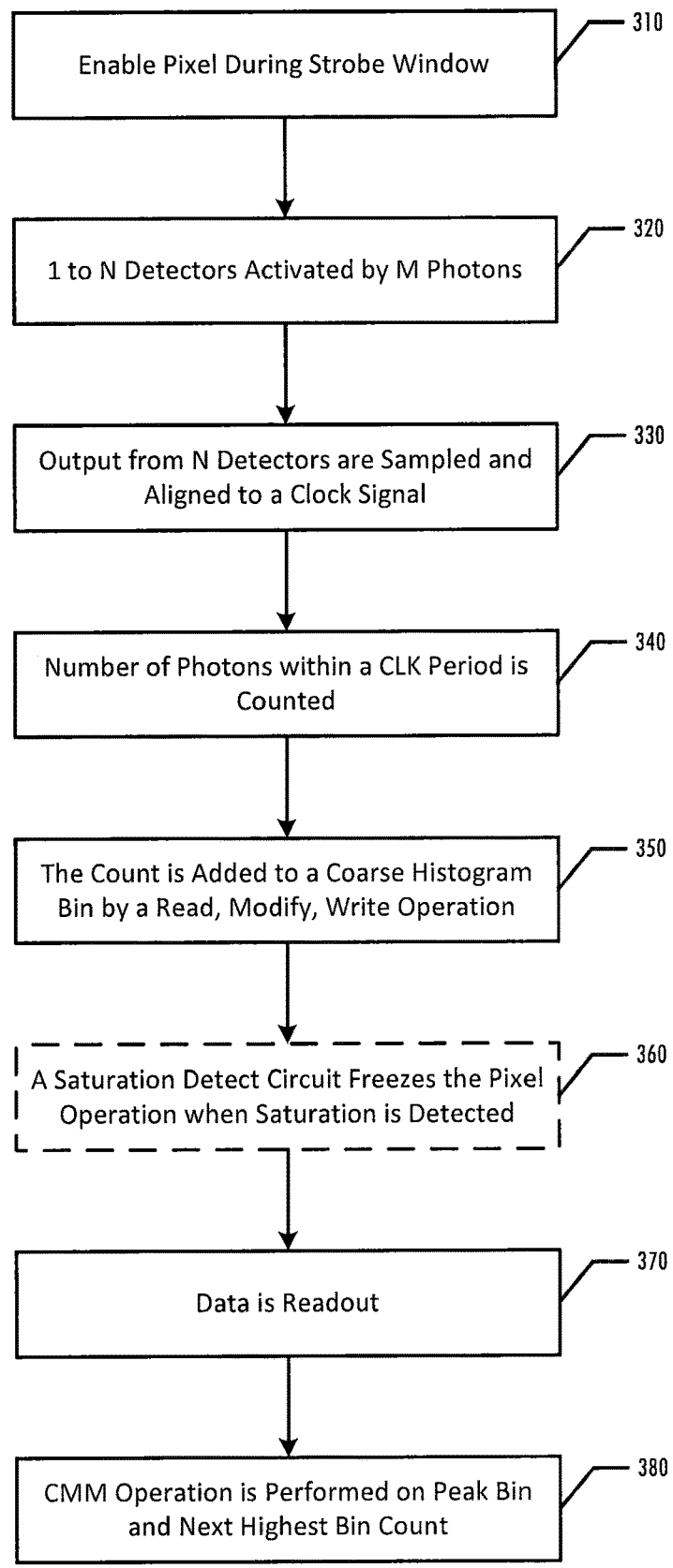
FIG. 3 is an example flowchart illustrating a circuit operation for using a coarse histogram to provide a CMM operation according to some embodiments described herein.
Figure 4:
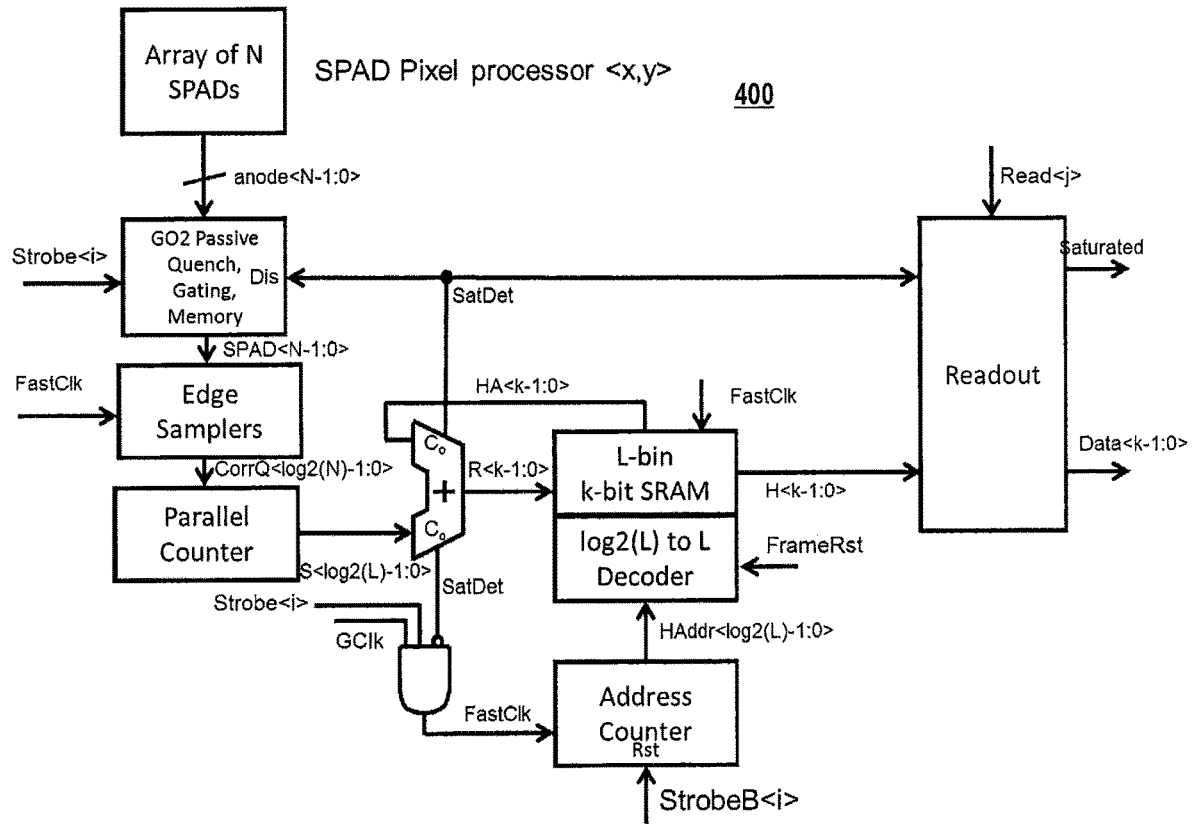
FIG. 4 illustrates an example pixel processing circuit, according to embodiments described herein.

FIG. 3 is an example flowchart illustrating a circuit operation for using a coarse histogram to provide a CMM operation, according to embodiments described herein. FIG. 4 illustrates a pixel processing circuit 400, according to embodiments described herein. The pixel processing circuit 400 may, in some embodiments, be or include a CMM pixel processing circuit 400. The example pixel processing circuit 400 may be configured to implement one or more of the operations illustrated in FIG. 3. In some embodiments, the pixel processing circuit 400 may be implemented by a DSP. The example pixel processing circuit 400 is illustrated as a SPAD CMM pixel processor that receives inputs from an array of N SPADs, but other single photon detector arrays may be used without deviating from the present invention.

Referring to FIGS. 3 and 4, operation of a pixel processing operation according to embodiments described herein may include enabling 310 the pixel during a strobe window, as controlled, for example, by a strobe signal Strobe<i>. In some embodiments, the pixel may be or include one or more SPADs. The pixel processing circuit 400 may include the use of clock signals, such as a global clock GClk and an internal clock FastClk. In some embodiments, FastClk may be a locally gated version of the global clock GClk that is active from the start of a sub-frame until a peak is detected, whereupon FastClk is inhibited. In some embodiments, FastClk may only be active during the strobe window (as illustrated by the logic in the pixel processing circuit 400 of FIG. 4).

Figure 5:
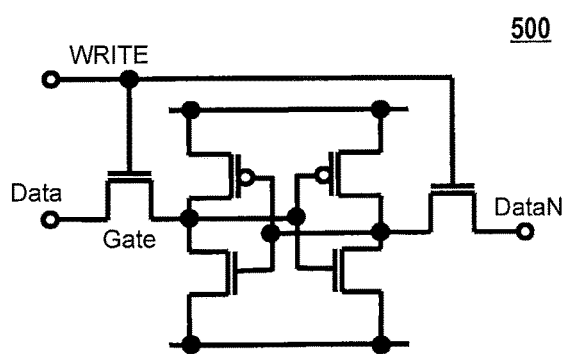
FIGS. 5 and 6 illustrate SPAD interface circuits that may be used for the pixel circuit of FIG. 4, according to some embodiments described herein.
Figure 6:
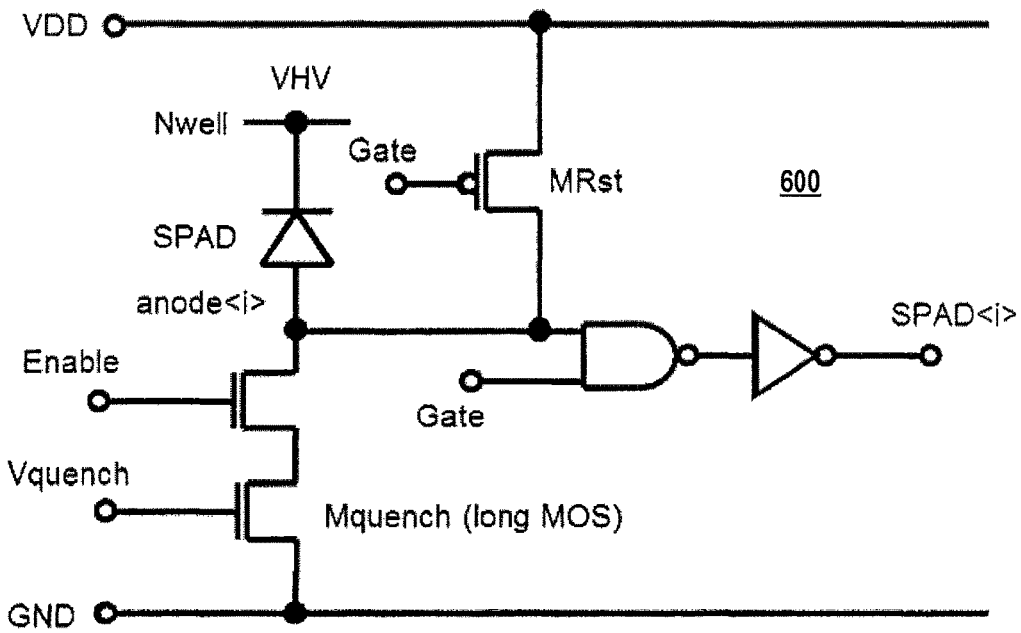

FIGS. 5 and 6 illustrate SPAD interface circuits 500, 600 that may be used for the pixel processing circuit 400 of FIG. 4, according to some embodiments described herein. The SPAD interface circuits 500, 600 may be incorporated as substrate isolated SPADs implemented in an n-well. In some embodiments, an ability to implement an active quench on the SPAD may be included.

Referring again to FIG. 3, some number of, e.g., N, of the detectors (e.g., SPADs) may be activated 320 by some number of, e.g., M, pixels. The number of activated SPADs may be detected, for example, by one or more edge sampling circuits. The output from the N detectors may be sampled and aligned 330 to a clock signal (e.g., FastClk). The number of photons that are detected by the detectors may be counted 340 within a clock period of the clock signal. In some embodiments, the clock signal may set a width of the histogram bin (e.g., in terms of the amount of time covered by the histogram bin). In some embodiments, the number of photons that are detected by the detectors may be counted by using an edge sampling circuit (also referred to herein as an edge detector) and a counting circuit. FIG. 4 illustrates the edge sampling circuit providing the signal CorrQ<log 2(N)-1:0> as output. In some embodiments, the signal CorrQ<log 2(N)-1:0> may provide a bitwise indication of which detectors have detected a pixel.

Figure 7:
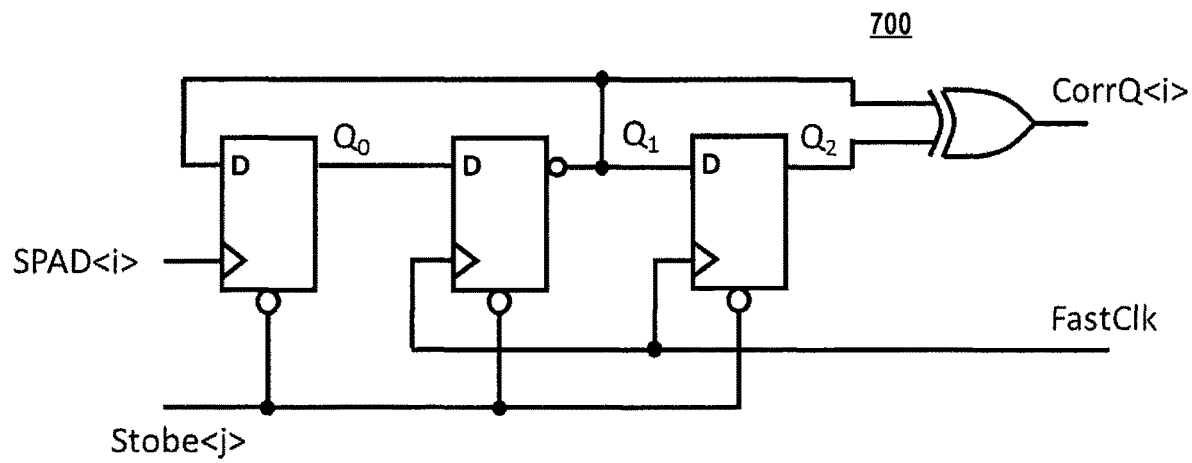
FIG. 7 is a schematic diagram of an example of an edge sampling circuit, according to some embodiments described herein.

FIG. 7 is a schematic diagram of an example of an edge sampling circuit 700, according to some embodiments described herein. The example edge sampling circuit 700 may determine if at least one SPAD rising edge (e.g., SPAD<i> in FIG. 4) that indicates a photon was detected occurred within a clock period (e.g., FastClk or GClk). The correlator may include output from a parallel counter which may determine the total number of detectors (e.g., SPADs) that fired (e.g., detected a photon) during the last clock period. Use of the parallel counter may save power by not activating the read-modify-write cycle of the histogram storage (e.g., SRAM) unless there is a non-zero number to integrate. If a rising edge occurred within the clock period, the output CorrQ may be maintained high for one clock period. If this is not true (i.e., at least one correlator rising edge has not occurred) then the output CorrQ may remain low for one clock period. This operation may serve to convert the pixel processing from an asynchronous domain to a synchronous edge sampled domain. This may avoid logic settling issues in, for example, a correlator ripple counter and time accumulator. In some embodiments, the synchronous edge sampled domain may be synchronous with the clock signal (e.g., FastClk or GClk), which may be synchronous with a pulse frequency of the emitter.

Figure 8:
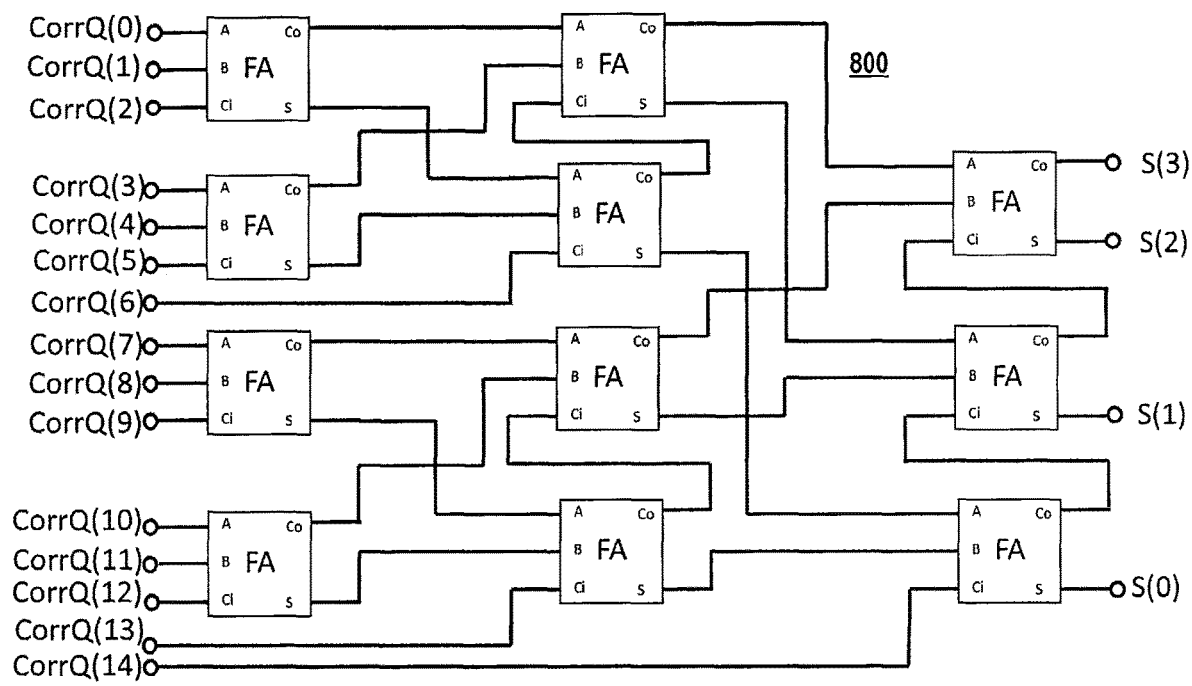
FIG. 8 illustrates an example parallel counter/summer that may be used in accordance with some embodiments described herein.

FIG. 8 illustrates an example parallel counter/summer 800 that may be used in accordance with some embodiments described herein. The example parallel counter/summer 800 of FIG. 8 is described, for example, in Swartzlander, Jr., "Parallel Counters," IEEE Transactions on Computers, Vol. C-22, 1973, pp. 1021-1024). The logic illustrated in FIG. 8 may used for a 15 input (e.g., SPAD) example. In an embodiment utilizing 2×2 SPAD configurations, the parallel counter/summer 800 may only use 2 half-adders (HA) and 2 full-adders (FAs) for four inputs. The Swartzlander approach illustrated in FIG. 8 is fully parallel but has settling speed limitations which can be addressed by a pipelined adder tree at the expense of extra flip-flops. An example of a pipelined adder tree is discussed in E. Fisher, I. Underwood and R. Henderson, "A Reconfigurable Single-Photon Counting Integrating Receiver for Optical Communications," in IEEE Journal of Solid-State Circuits, vol. 48, no. 7, pp. 1638-1650, Jul. 2013. In some embodiments, the parallel counter/summer 800 may be replaced with a circuit configuration that performs a logical OR operation on the synchronized detector (e.g., SPAD) outputs. Such a configuration may be simpler to implement, but may be less effective in some situations, such as in environments with high light levels. The output of the parallel counter may be the number of detectors (e.g., SPADs) that detected a pixel during the time duration associated with a respective histogram bin. This count is illustrated in FIG. 4 as S<log 2(L)-1:0>, where L is the number of histogram bins.

Figure 9:
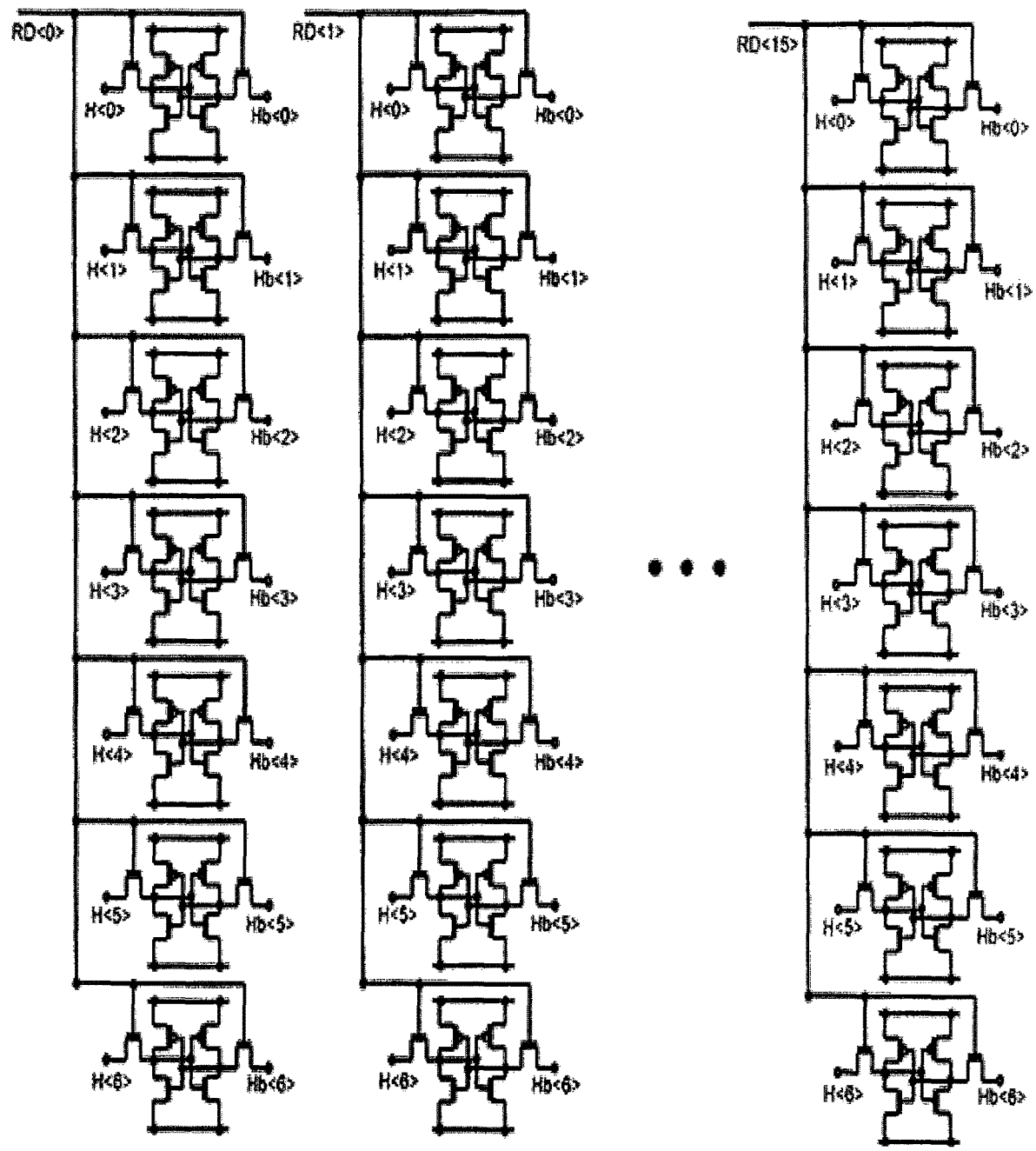
FIG. 9 illustrates an example memory that provides bins in an SRAM bank that may be used in accordance with some embodiments described herein.

Referring again to FIG. 3, the clock period may establish a width (e.g., a time duration) of a given bin of the histogram. The count of detectors during the clock period that detected a photon (e.g., S<log 2(L)-1:0>) may be added 350 to the current count in the particular histogram bin (e.g., HA<k-1:0>, where k is the number of bits per bin) by a read-modify-write operation in which the current content of the given histogram bin, indexed by the clock period, are readout and added to the determined pixel count for that bin. The result (e.g., R<k-1:0>) may then be written back to the respective histogram bin. The bins may be cycled through by an address driven by the system clock within a strobe period of interest. In some embodiments, as the strobe window advances, a given address for a histogram bin (e.g., which bin is associated with a given strobe window, illustrated as HAddr<log 2(L)-1:0 in FIG. 4) advances as well such that the histogram bin being analyzed/updated increments with the clock. In some embodiments, the histogram may be stored in a memory, such as a static random access memory (SRAM). FIG. 9 illustrates an example memory 900 that provides bins an SRAM bank that may be used in accordance with some embodiments described herein.

In optional operation 360, a saturation detect circuit may freeze operation of the pixel processing circuit when a saturation event is detected (e.g., SatDet). Freezing the operation of the pixel may include maintaining a state of the pixel without providing control signals so as to detect further photons and/or blocking the further calculation of TOA values associated with the pixel. Freezing may also imply de-asserting the gate input to the SPAD interface circuit above to inhibit Geiger mode pulsing of the SPAD. This operation may save power by preventing the SPAD anode from toggling (large capacitance) and further preventing any downstream switching activity in the pixel which may consume power. Freezing may also be accomplished by gating the global clock to the pixel preventing switching activity associated with the clocked circuitry in the pixel. Freezing operation of the pixel may conserve power and/or avoid data corruption.

Figure 10:
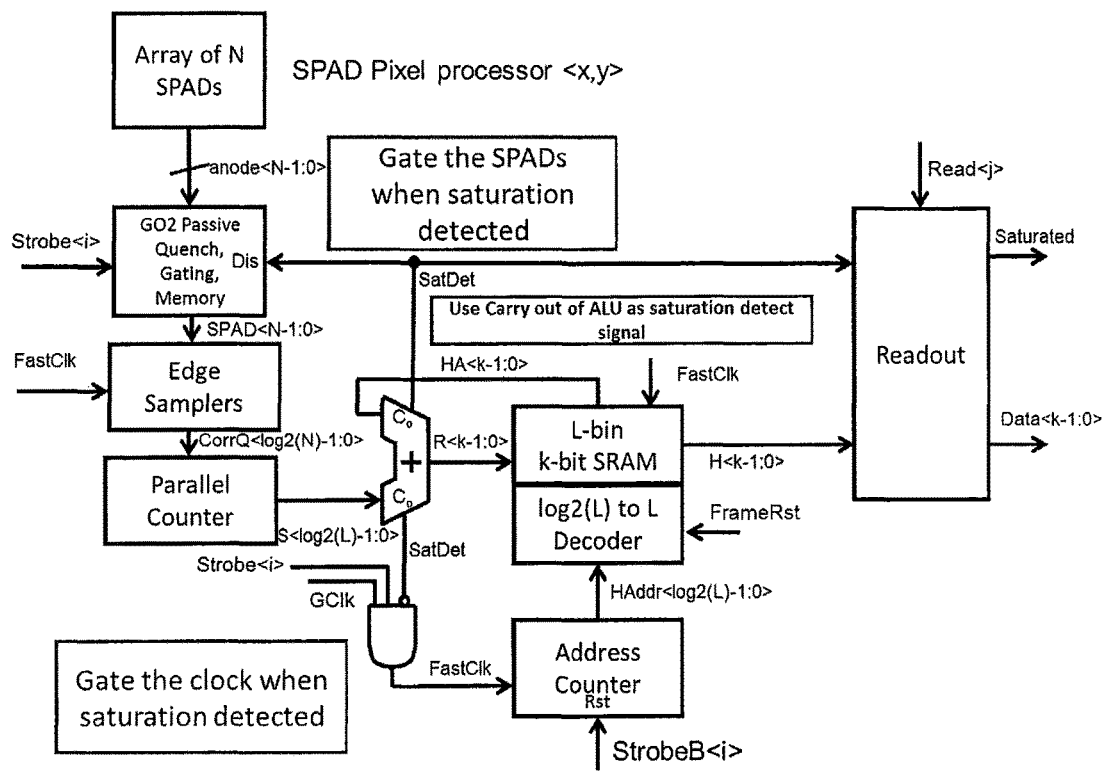
FIG. 10 is a block diagram illustrating an example of a circuit configuration and circuit operations to freeze the pixel operations, according to some embodiments described herein.

FIG. 10 is a block diagram illustrating an example of a circuit configuration and circuit operations to freeze the pixel operations, according to some embodiments described herein. As illustrated in FIG. 10, when a saturation event is detected (e.g., SatDet), both the SPADs and the clock generation (e.g., FastClk) may be gated. In some embodiments, a carry out of an arithmetic logic unit (ALU), such as an ALU performing counting operations for the histogram bins, may be used as the saturation detect signal. The saturation detect may be realized by detecting that the carry out of the full adder has toggled high indicating some bin have exceeded $2^k-1$ (where k is number of SRAM bits in a bin). In some embodiments, this value will not be surpassed, as the pixel is frozen immediately upon saturation detection, and the pixel will be inactive until readout, freezing the state of the local histogram at the point in time where the saturation was detected. Other photon events which may have been detected may be discarded from this time (e.g., when the operations are gated) until the start of the next sub-frame when the pixel is reset.

Figure 11:
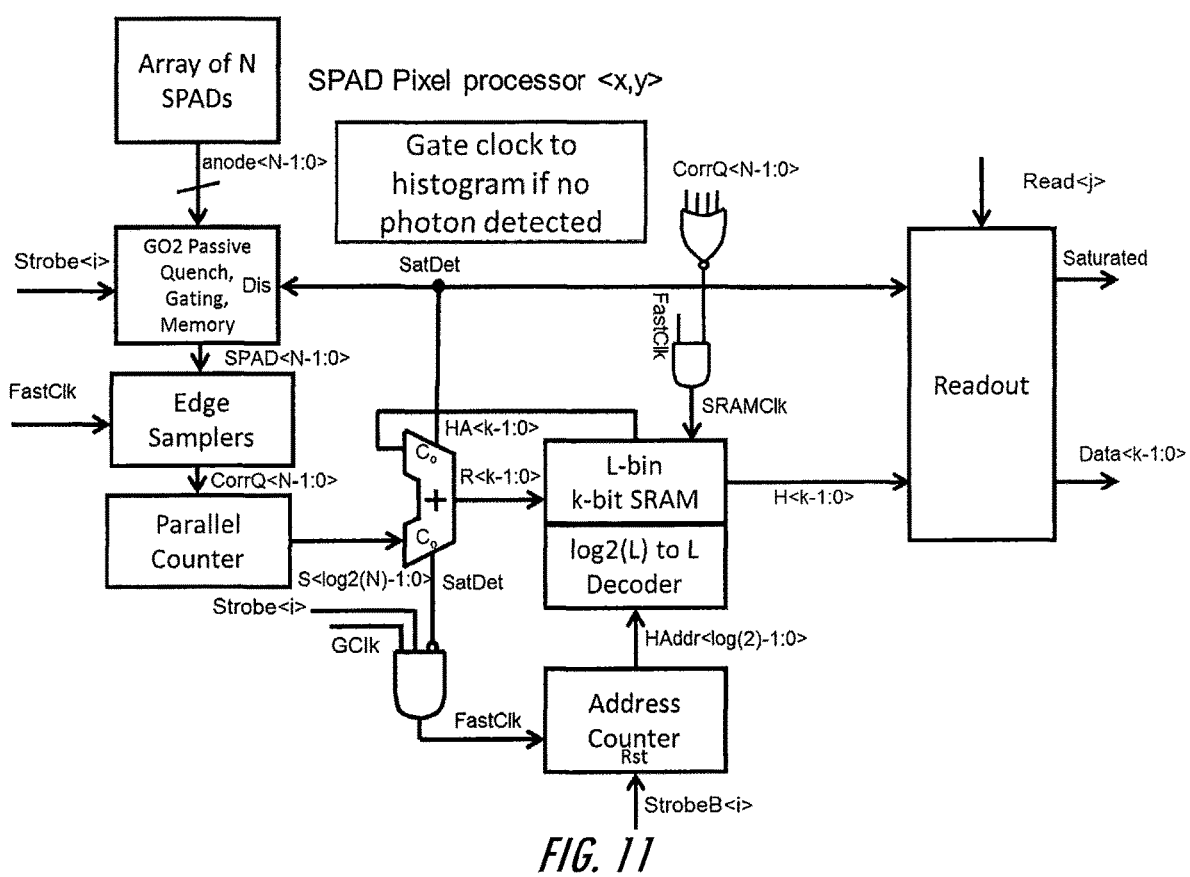
FIG. 11 is a block diagram illustrating an example of a circuit configuration and circuit operations to gate a clock signal to the histogram in response to no photon being detected by a detector, according to some embodiments described herein.

In some embodiments, a clock signal to the histogram (e.g., the histogram SRAM) may be gated in response to no photon being detected by the detector (e.g., a SPAD). An example of this operation is illustrated in FIG. 11. The embodiment illustrated in FIG. 11 may avoid a read-modify-write operation associated with access to the histogram bins. As a result, charging/discharging of the SRAM bitlines and/or activation of the SRAM write drivers or read comparators may be avoided. This may result in significant power savings, especially in low background scenarios as the power to read/write the SRAM may be considerable due to large bitline and address line capacitances. Other operations such as SPAD sampling to generate CorrQ may continue in this embodiment.

Referring again to FIG. 3, in operation 370, the data readout may be performed, which may provide information from the generated histogram. A CMM operation 380 may then be performed, based on the stored histogram information, of a saturation bin count and, in some embodiments, a count of the next highest bin or bins to resolve the time-of-flight measurement.

Embodiments as described herein may provide mechanisms for generating a CMM calculation for a pixel as a part of calculating a time-of-flight measurement that have multiple advantages. For example, operations as described herein may utilize a bin size (e.g., a TDC resolution) that is defined by a clock signal having a period that is equal to the laser (e.g., a vertical cavity surface emitting laser (VCSEL)) pulse width (PW) (e.g., 2-10 ns in some embodiments). In this respect, "bin size" refers to the time duration within a strobe window that is represented by a particular bin. For example, if a particular strobe window were to cover 100 ns and have 25 bins, each bin would represent 4 ns.

As noted above, in some embodiments the bin size may equal the pulse width (e.g., the full width at half maximum, FWHM) of the emitter, such as a laser, but the present invention is not limited thereto. In some embodiments, the bin size may be a fraction of the pulse width, such as, for example, one-half, one-quarter, one-eighth, or one-sixteenth of the emitter pulse width. This lower resolution as compared to typical TDC operations may reduce the high speed requirement on the clock, since a higher level of resolution is not required. For example, a global 100 MHz clock frequency may be used, as opposed to traditional high resolution TDC frequency, which may use/incorporate ring oscillators on the order of several GHz. The clock frequency of 100 MHz is only an example, and other clock frequencies may be used, such as clock frequencies between 50 MHz and 300 MHz. In some embodiments, the clock frequency may be as high as 1 GHz. The use of a lower speed clock as compared with conventional methods may be advantageous for power consumption. In some embodiments, no pixel level timing generation may be needed. In some embodiments, it may be possible to combine the embodiments described herein with a local clock source to provide additional functionality should a much shorter distance range and/or higher range resolution be desired (e.g., of the order of a few meters).

As used herein, a "coarse" histogram may refer to a histogram in which the resolution and/or time duration associated with respective bins (also known as the "bin width") of the histogram are greater (e.g., covers a time duration greater) than one-sixteenth of the pulse width of the optical signal of the emitter being used by the LIDAR system. In some embodiments the bin width may be equal to the pulse width of optical signal of the emitter. In some embodiments the bin width may be greater than one-half of the pulse width of the optical signal of the emitter. In some embodiments the bin width may be greater than one-fourth or one-eighth of the pulse width of the optical signal of the emitter.

Figure 12A:
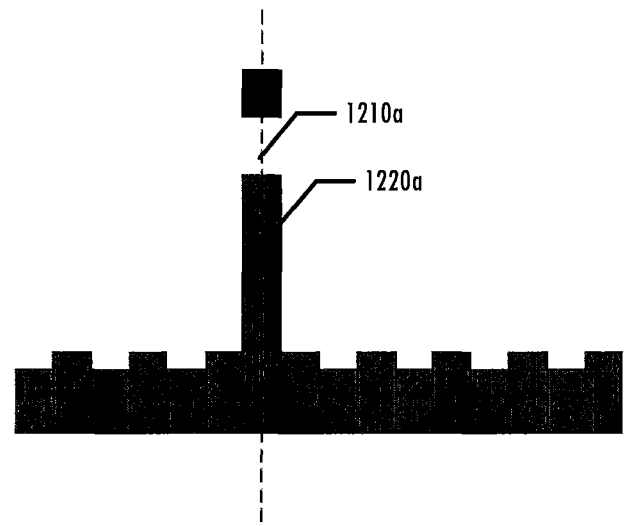
FIG. 12A is a schematic diagram illustrating a scenario in which a laser return arrives completely within a given bin in a coarse histogram according to some embodiments described herein.

Despite having bin widths of lower granularity, calculating the time of arrival of photons may still be performed with adequate accuracy. For example, FIG. 12A is a schematic diagram illustrating a scenario in which a laser return 1210a arrives completely within a given bin in a coarse histogram according to some embodiments described herein. As illustrated in FIG. 12A, if the laser return 1210a falls completely within one bin 1220a, then the time of arrival is estimated as being in the bin center, and may be found based on the timing characteristics of the bin (e.g., the bin address based on the clock signal).

Figure 12B:
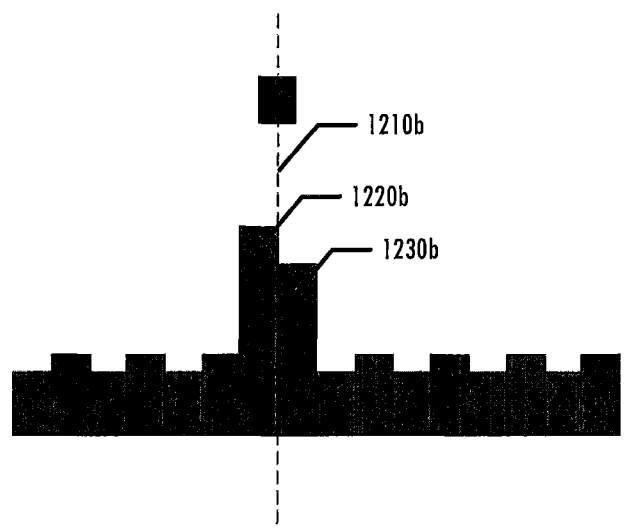
FIG. 12B is a schematic diagram illustrating a scenario in which a laser return arrives between two bins in a coarse histogram according to some embodiments described herein.

FIG. 12B is a schematic diagram illustrating a scenario in which a laser return 1210b arrives between two bins in a coarse histogram according to some embodiments described herein. As illustrated in FIG. 12B, if the laser return 1210b falls between two bins 1220b, 1230b then the ratio of counts between them (e.g., the pixel counts associated with each bin) may determine the TOA. Thus, having a bin width (e.g., a time duration over which the bin is collected/sampled) that is equal to or less than the laser pulse width but greater than one-sixteenth of the laser pulse width is sufficient for TOA calculation.

In addition, embodiments as described herein provide improvements in that the operations of the strobe window and the coarse histogram are combined. In some embodiments, the strobe windows may determine the width of the coarse histogram bins and/or the intervals over which the SPADs are sampled. The use of the strobe window may not only reject background events but may also limit the period in time that requires histogramming. This may result in the significant reduction of in-pixel resources used for the histogram generation and the resulting data rates used for operation. In addition, the strobe window may also allow for operating the clock driven histogram over regions of the array, rather than the whole array, thus saving power. For example, in some embodiments, a lower distance range may be used and/or processed at wider angles (e.g., 30 to 120 degrees) so localized strobe signals may be used to inhibit and/or reduce the histogramming pixels in this region of the array while pixels in the central region (e.g., 30 degrees) continue to operate at the longer distance range. In some embodiments, only processing at the lower distance range may mean that the clock driven histogram is not operated over those time durations (e.g., a time duration since the firing of the emitter) that are associated with farther distances.

In some embodiments, calculation of the CMM may include the readout of the full histogram. In some embodiments, the TOA calculation may perform the CMM calculation over bins of interest. For example, some embodiments may use a 2-bin CMM algorithm. A peak bin may be identified, and the CMM computation may be performed only over the peak bin and its immediate adjacent (left or right) neighbor, whichever is highest in pixel count. This operation may yield very accurate TOA calculations with respect to other CMM approaches. In some embodiments, further background rejection may be performed using only peak bins. In some embodiments, an on-chip DSP can perform the full task of calculating the TOA based on a calculated CMM and send the final CMM-calculated TOA for readout, which may reduce data rates to external entities.

Though the 2-bin CMM algorithm approach discussed herein uses the peak bin and one adjacent neighbor bin, the present inventive concepts are not limited thereto. In some embodiments, additional bins may be included with the peak bin in calculating the CMM operation. For example, the CMM operation may use the two immediately adjacent bins to the peak bin (e.g., on both sides of the peak bin) for some laser pulses (e.g., laser pulses which do not have square topped profiles or where the laser pulse width is not exactly one histogram bin wide such that energy from the laser pulse will fall into both adjacent bins). Other variations including additional bins will be understood by those of ordinary skill in the art without deviating from the inventive concepts described herein.

Figure 13:
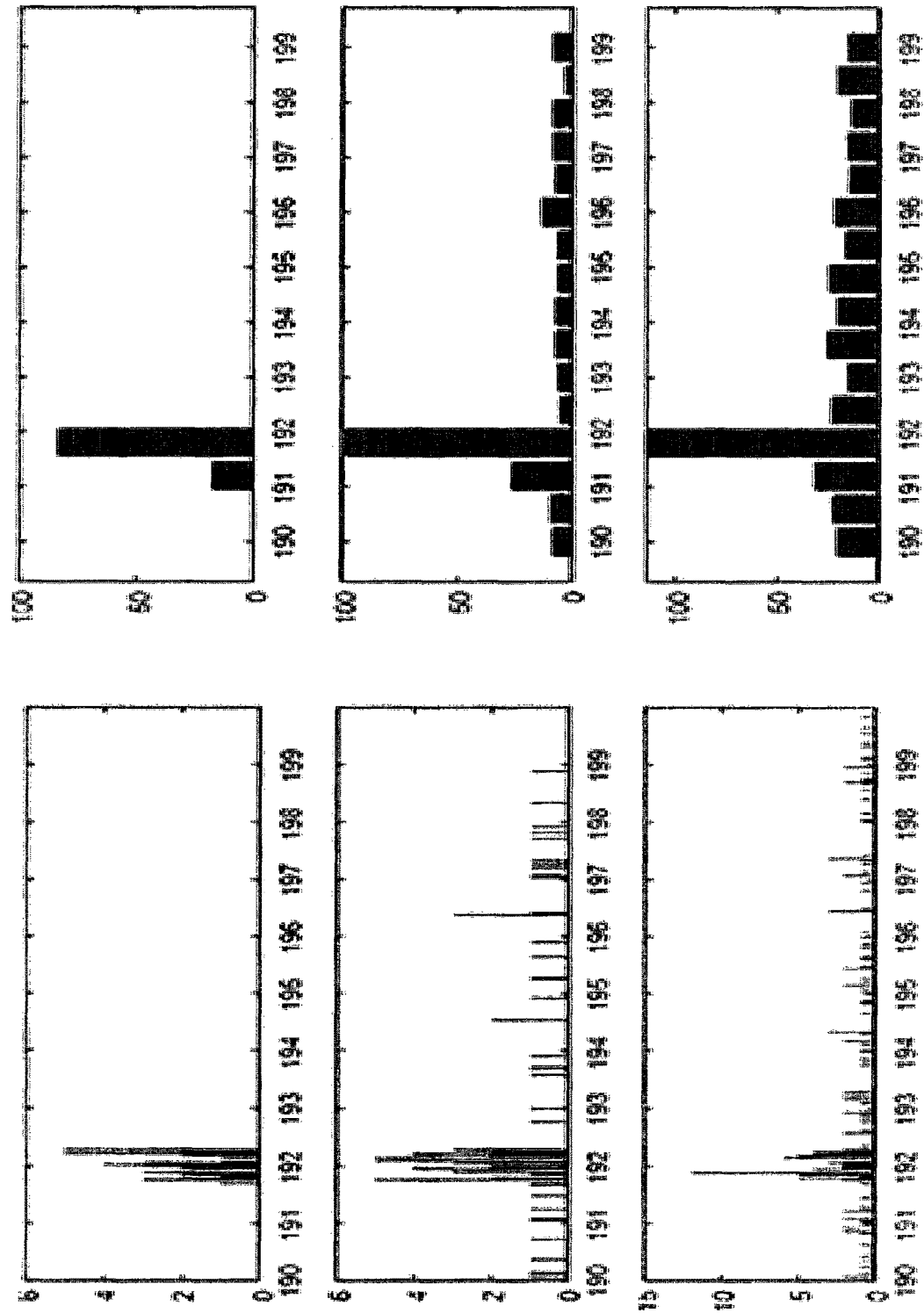
FIG. 13 schematically illustrates example comparisons of TDC-based histograms and the use of coarse histograms, according to some embodiments described herein.

FIG. 13 schematically illustrates example comparisons of TDC-based histograms and the use of coarse histograms, according to some embodiments described herein. FIG. 13 illustrates results for different configurations of an emitter of the LIDAR system.

Referring to FIG. 13, the first set of three simulations (on the left) illustrate a TDC-based LIDAR system with high temporal resolution (100 ps) using Time-Correlated Single Photon Counting (TCSPC). The simulations show a single strobe sub-frame extending from 190 to 200 m with varying levels of background (Bg) from 0 to 100 kLux for a target at range 192 m.

The second set of three simulations (on the right) are provided under similar conditions but with coarse histogram bins, according to some embodiments described herein, of 10 ns each (chosen to be equal to the laser pulse width). The experimental results illustrated in FIG. 13 indicate that the use of coarse-histogram-based CMM method may provide equivalent accuracy to more granular models while still maintaining acceptable values of distance calculation.

The use of peak detect algorithms according to embodiments described herein provide additional benefits. As discussed herein, in some embodiments, a threshold value may be set in the pixel such that if any historgram bin reaches that threshold value (e.g., reaches saturation), the pixel can be frozen in order to save power. The embodiments described herein provide a simple saturation detection implementation using an ALU carry out. As a result, a more complicated decoder may not be necessary to implement this function. This saturation detect operation can also be used in range dependent frame rate sensor architectures where the saturation detect flag can be used to drive a readout operation.

The embodiments described herein also provide a beneficial SPAD combining circuit that does not require OR or XOR trees such as may be used in conventional devices. Instead an edge detection circuit and a parallel counter circuit may be used to determine the number of detector (e.g., SPAD) events that occurred within a histogram bin (e.g., with a clock cycle).

In the embodiments described herein, pixel area is further reduced by utilizing SRAM cells in the pixel. This may incorporate careful timing synchronized with the sampling clock. The embodiments described herein may employ a rolling SRAM read-modify-write sequence allowing the construction of the histogram from multiple detected events at every clock cycle.

Figure 14:
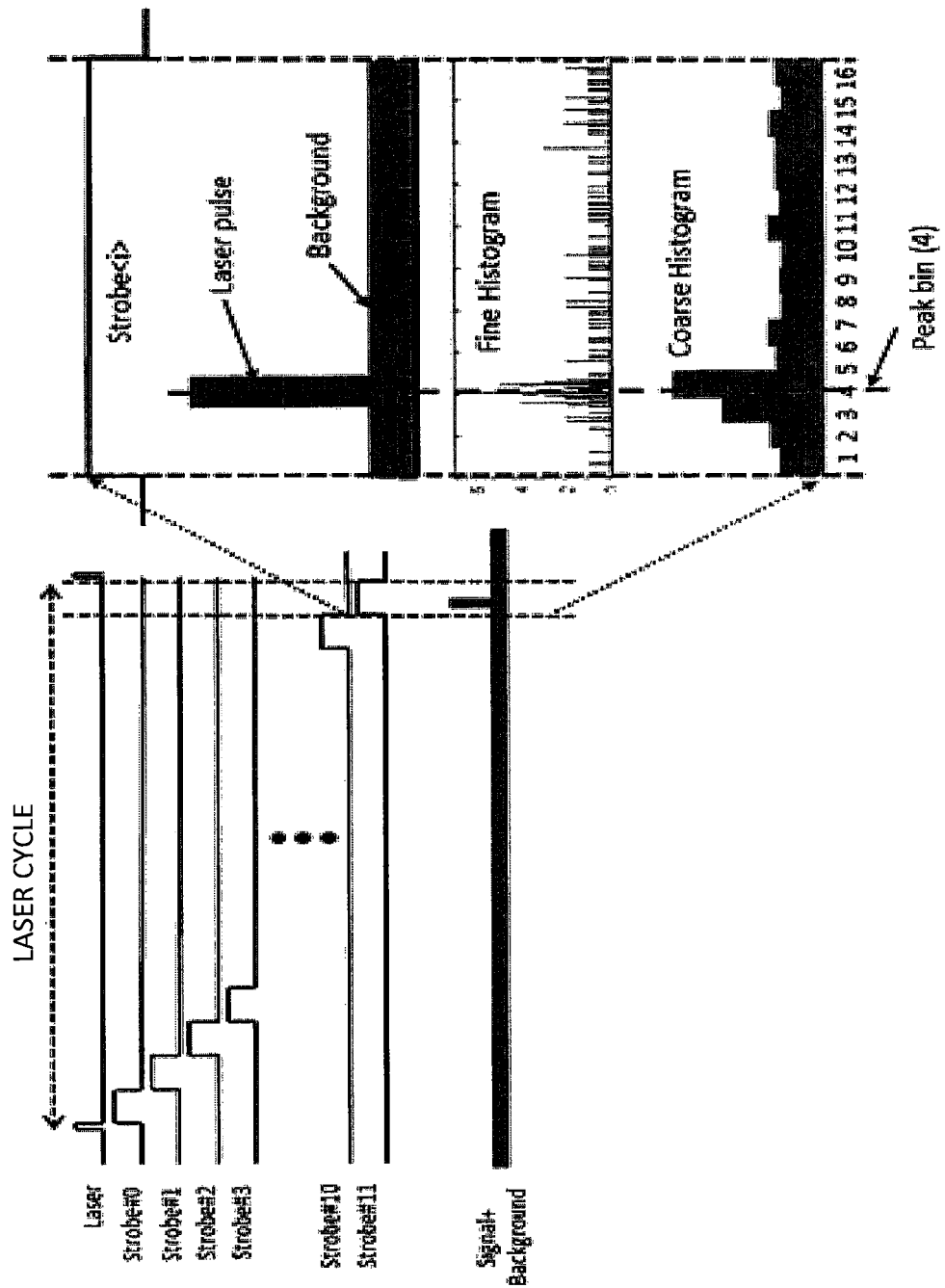
FIG. 14 graphically illustrates a histogram-assisted center of mass calculation, according to some embodiments described herein.

FIG. 14 graphically illustrates a histogram-assisted center of mass calculation, according to some embodiments described herein. As illustrated in FIG. 14, a series of strobe signals (e.g., corresponding to strobe windows) may be provided over a given time duration. During each strobe window, some level of background noise may be reflected across the pixels. During one strobe window (e.g., Strobe #11) the laser return is detected. As illustrated in FIG. 14, the more granular conventional TDC approach (denoted by "Fine Histogram") may report a number of varying peaks over the sample period. In contrast, in the coarse histogram implementation (denoted by "Coarse Histogram"), a smaller number of histogram bins (for example, between 10 and 25) may be used, and the laser pulse return may generate a peak in one of the histogram bins (e.g., histogram bin 4).

In some examples of the embodiments described herein, the peak bin may be determined, and the largest neighbouring histogram bin to the peak histogram bin (e.g., histogram bin 3) may also be determined for use in the center of mass calculation. As one example of the embodiments described herein, the center of mass CM may then be calculated as:

$$CM = \frac{H(Bp)*Np + H(Bn)*Nn}{H(Bp) + H(Bn)} - 1 \qquad <\text{Eqn 1}>$$

where $H(Bp)$ is the count held in the peak histogram bin (e.g., $H(4)$), $H(Bn)$ is the count held in the neighboring histogram bin (e.g., $H(3)$), Np is the number of the peak histogram bin (e.g., 4) and Nn is the number of the neighboring histogram bin (e.g., 3).

Given the center of mass, CM, the distance range R may be calculated as:

$$R = \frac{c(CM*Tintegrate + \text{strobe}<i>)}{2} \qquad <\text{Eqn 2}>$$

where Tintegrate is the period of the clock signal to which the bins are synchronized (e.g., GClk or FastClk), c is the speed of light, and strobe<i> is the time duration of the beginning of the strobe window for the peak histogram bin. Eqn 1 and Eqn 2 discussed above are merely examples of ways in which the center of mass and the distance range may be calculated and are not intended to limit the present invention. Other methods of calculating the center of mass and/or distance range will be understood by those of ordinary skill in the art without deviating from the scope of the present invention.

Figure 15:
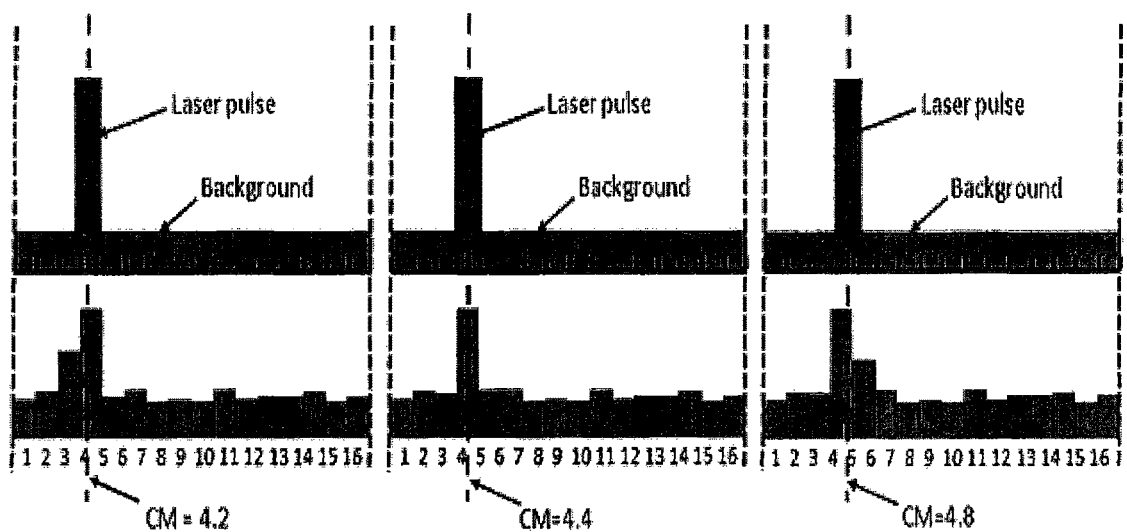
FIG. 15 illustrates additional examples of histogram bins for slightly varying laser pulse returns, according to some embodiments described herein.

FIG. 15 illustrates additional examples of histogram bins for slightly varying laser pulse returns, according to some embodiments described herein. As illustrated in FIG. 15, despite the use of coarse histogram sampling, fine distance resolution may still be achieved by center of mass calculation (e.g., <10 cm avg. error at 200 m). In some embodiments, greater background rejection may be achieved by calculating the center of mass only on peak bins, thus reducing optical filter passband requirements. The operations described herein may result in low operating frequencies and power consumption (e.g., 100 MHz @ 0.25 μW/pixel) at a modest pixel area (e.g., 25 μm in 45 nm CMOS).

In some embodiments, background correction can be accomplished by determining, by the pixel (or column logic), a peak bin number (npk). Then, the neighboring (e.g., immediately adjacent the peak bin) peak bin number (nbpk) with the highest pixel count may be determined. Next, a sum of the counts of the bins which are not npk and nbpk ($H_{bg}$) may be calculated as (assuming nbpk<npk):

$$H_{bg} = \Sigma_{i=1}^{nbpk-1} H(i) + \Sigma_{i=npk+1}^{L} H(i) \qquad \text{<Eqn 3>}$$

The above example assumes a number of histogram bins of L, as a non-negative integer. Next, an average of those histogram bins may be calculated as $H_{av} = H_{bg}/(L-2)$. Then, the background corrected center of mass (CM) may be calculated as:

$$CM = \frac{((H(nbpk) - H_{av}) \times nbpk + (H(npk) - H_{av}) \times npk)}{(H(nbpk) - H_{av}) + (H(pk) - H_{av})} \qquad \text{< Eqn 4 >}$$

Eqn 3 and Eqn 4 discussed above are merely examples of ways in which the center of mass and are not intended to limit the present invention. Other methods of calculating the center of mass will be understood by those of ordinary skill in the art without deviating from the scope of the present invention.

The embodiments described herein provide multiple advantages over conventional devices. Some embodiments described herein use a coarse histogram within a strobe window to reduce and/or minimize circuit resources and/or power and/or to reject background noise. In addition, some embodiments restrict calculations of center of mass to a peak histogram bin and a close neighboring histogram bin to significantly reduce measurement error. Some embodiments described herein provide direct generation of histograms without using a TDC, instead using coarse binning. This provides an advantage of the use of a global clock without a need to calibrate local TDCs. Some embodiments described herein may be benefit from the use of a low clock frequency (e.g., 100 MHz for a 10 ns laser pulse), which may reduce power consumption and permit read-increment-write SRAM operation. Some embodiments described herein may use SRAM memory for histogram data, which may save area driven by unique bin address cycling (e.g., in some embodiments, the bin address is not a TDC code). Some embodiments described herein may provide processing of multi-events through the use of parallel adder tree without using conventional OR/XOR trees or correlator circuits. Some embodiments described herein may provide saturation detection through adder carry, which may utilize a less complex algorithm. Some embodiments described herein provide power savings by blocking pixel operation (e.g., freezing) after saturation detection. Some embodiments described herein provide the possibility of the use of a range dependent frame rate architecture driven by the saturation detect signal described herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment," "one embodiment," and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation. The following claims are provided to ensure that the present application meets all statutory requirements as a priority application in all jurisdictions and shall not be construed as setting forth the scope of the present invention.

The invention claimed is:

1. A Light Detection and Ranging (LIDAR) measurement circuit, comprising:
   an array of single photon detectors configured to detect photons responsive to emission of an optical signal from an emitter; and
   a pixel processing circuit that is configured to calculate an estimated time of arrival of photons incident on the array of single photon detectors by identifying a subset of a plurality of coarse histogram bins, and performing a center of mass calculation on the subset, wherein respective ones of the plurality of coarse histogram bins are associated with a duration that is greater than one-sixteenth of a pulse width of the optical signal, and the subset comprises less than an entirety of the plurality of coarse histogram bins.

2. The LIDAR measurement circuit of claim 1, wherein the emitter is a laser and a duration of respective ones of the plurality of coarse histogram bins is based on the pulse width of the optical signal.

3. The LIDAR measurement circuit of claim 2, wherein the duration of the respective ones of the plurality of coarse histogram bins is between greater than or equal to one-fourth of the pulse width of the laser and less than or equal to the pulse width of the laser.

4. The LIDAR measurement circuit of claim 1, wherein the pixel processing circuit is further configured to:
   utilize an edge sampling circuit to calculate a number of the array of single photon detectors that detected a photon based on asynchronously received signals from respective ones of the array of single photon detectors; and
   output the number of the array of single photon detectors that detected the photon according to a clock signal.

5. The LIDAR measurement circuit of claim 1, wherein the subset comprises a peak histogram bin of the plurality of coarse histogram bins.

6. The LIDAR measurement circuit of claim 5, wherein the subset consists of the peak histogram bin and at least one neighboring bin of the plurality of coarse histogram bins that is adjacent the peak histogram bin.

7. The LIDAR measurement circuit of claim 6, wherein the at least one neighboring bin comprises a first neighboring bin and a second neighboring bin of the plurality of coarse histogram bins that are immediately adjacent the peak histogram bin.

8. The LIDAR measurement circuit of claim 1, wherein the pixel processing circuit is further configured to detect a saturation in a first bin of the coarse histogram bins and block an operation of the pixel processing circuit responsive to the detection of the saturation.

9. The LIDAR measurement circuit of claim 1, wherein the pixel processing circuit is further configured to calculate the estimated time of arrival of the photons incident on the array of single photon detectors utilizing a clock signal that is between 50 MHz and 1 GHz.

10. The LIDAR measurement circuit of claim 9, wherein the clock signal is synchronous with a pulse frequency of the emitter.

11. The LIDAR measurement circuit of claim 1, wherein the pixel processing circuit is further configured to determine an address for accessing a respective one of the plurality of coarse histogram bins based on a clock signal.

12. The LIDAR measurement circuit of claim 11, wherein the address is sequentially incremented or decremented based on an amount of time since the emission of the optical signal.

13. The LIDAR measurement circuit of claim 11, wherein the plurality of coarse histogram bins are stored in a static random access memory (SRAM).

14. A Light Detection and Ranging (LIDAR) measurement circuit, comprising:
   an activated detector counting circuit coupled to a plurality of detectors and configured to output a count of a number of the plurality of detectors that have detected a photon within a given time duration;
   an adder circuit configured to update a coarse histogram bin of a plurality of coarse histogram bins based on the count that is output from the activated detector counting circuit; and
   a Center of Mass Method (CMM) computation circuit configured to calculate an estimated time of arrival of photons incident on the plurality of detectors by performing a center of mass calculation on a subset comprising less than an entirety of the plurality of coarse histogram bins.

15. The LIDAR measurement circuit of claim 14, wherein the subset of the plurality of coarse histogram bins comprises a peak histogram bin containing a highest count of the plurality of coarse histogram bins.

16. The LIDAR measurement circuit of claim 15, wherein the subset of the plurality of coarse histogram bins consists of the peak histogram bin and at least one neighboring bin of the plurality of coarse histogram bins that is adjacent the peak histogram bin.

17. The LIDAR measurement circuit of claim 14, wherein the plurality of detectors are configured to detect photons responsive to an optical signal emitted from an emitter; and
   wherein respective ones of the plurality of coarse histogram bins are associated with a duration that is greater than one-sixteenth of a pulse width of the optical signal.

18. The LIDAR measurement circuit of claim 14, wherein the adder circuit is further configured to generate a saturation detection signal responsive to detection of a saturation in a first bin of the plurality of coarse histogram bins.

19. The LIDAR measurement circuit of claim 14, wherein the activated detector counting circuit is further configured to utilize an edge sampling circuit to output the number of the detectors that detected the photon according to a clock signal.

20. The LIDAR measurement circuit of claim 19, wherein the CMM computation circuit is configured to calculate the estimated time of arrival of the photons incident on the plurality of detectors during a period of the clock signal.

21. The LIDAR measurement circuit of claim 14, wherein the adder circuit is further configured to determine an address for accessing the coarse histogram bin based on a clock signal.

22. A method for operating a Light Detection and Ranging (LIDAR) measurement circuit, comprising:
   detecting photons associated with an emission of an optical signal from an emitter by an array of single photon detectors; and calculating an estimated time of arrival of photons incident on the array of single photon detectors by identifying a subset of a plurality of coarse histogram bins, and performing a center of mass calculation on the subset, wherein respective ones of the coarse histogram bins are associated with a duration that is greater than one-sixteenth of a pulse width of the optical signal, and the subset comprises less than an entirety of the plurality of coarse histogram bins.

23. The method of claim 22, further comprising:
calculating a number of the array of single photon detectors that detected a photon based on asynchronously received signals from respective ones of the array of single photon detectors; and
synchronously outputting the number of the array of single photon detectors that detected the photon according to a clock signal.

24. The method of claim 22, wherein the subset consists of a peak histogram bin of the plurality of coarse histogram bins and at least one neighboring bin of the plurality of coarse histogram bins that is adjacent the peak histogram bin.

25. The method of claim 22, further comprising:
detecting a saturation in a first bin of the coarse histogram bins; and
blocking an operation of the LIDAR measurement circuit responsive to the detection of the saturation.

26. The method of claim 22, further comprising determining an address for accessing a respective one of the plurality of coarse histogram bins based on a clock signal.

* * * * *

UNITED STATES PATENT AND TRADEMARK OFFICE
CERTIFICATE OF CORRECTION

PATENT NO. : 11,639,990 B2
APPLICATION NO. : 16/746218
DATED : May 2, 2023
INVENTOR(S) : Robert Henderson et al.

It is certified that error appears in the above-identified patent and that said Letters Patent is hereby corrected as shown below:

In the Specification

Column 15, Line 6, Equation 3:
Please correct "$H_{bg}=\Sigma_{i=1}^{nbpk-1}H(i)+\Sigma_{i=npk+1}^{L}H(i)$"

To read -- $H_{bg} = \sum_{i=1}^{nbpk-1} H(i) + \sum_{i=npk+1}^{L} H(i)$ --

Signed and Sealed this
Tenth Day of October, 2023

Katherine Kelly Vidal
*Director of the United States Patent and Trademark Office*